United States Patent Office 3,047,535
Patented July 31, 1962

3,047,535
METAL SALTS OF SUBSTITUTED PHOSPHORIC ACID AS CURING AGENTS FOR POLYSILOXANES
John Gwynant Evans, Menston-in-Wharfdale, and Geoffrey Howard Crawshaw, Leeds, England, assignors to The Bradford Dyers' Association Limited, Yorkshire, England, a corporation of Great Britain
No Drawing. Original application Jan. 13, 1958, Ser. No. 708,378. Divided and this application Sept. 3, 1958, Ser. No. 758,683
Claims priority, application Great Britain Jan. 14, 1957
27 Claims. (Cl. 260—46.5)

Many kinds of organo silicon compounds, generally known as silicones, are useful agents for application to surfaces to give protection against the ingress of water or against the consequences of deposition of water or moisture. The surfaces may be those of fibrous or hairy matter as in the case of materials such as textiles, paper, wood, leather and fur, in which case the application of silicones may impart hydrophobic or water-repellent properties; or they may be the surfaces of more or less porous materials such as unglazed and unvitrified ceramics and masonry, or substantially non-porous materials such as metal and glass.

In many cases a curing agent, which is a metal compound, is applied with the silicone to bring about polymerization, or more generally further polymerization, of the silicone, or in some other way an improved fixation of the silicone on the substrate. There may be a chemical or physico-chemical reaction between the silicone and the substrate to which it is applied, or the effect may be practically entirely physical. The amount of silicone deposited on the substrate surfaces may be extremely small, especially when hydrophobic properties are being imparted thereby, or it may be larger as in the production of polish or varnish coatings. We will refer herein to the effects generally as protective finishes.

Amongst the kinds of silicones which are used as aforesaid are linear branched chain or any cross-linked polymers, or blends thereof, containing silicon atoms linked to oxygen, and on the average more than one hydrocarbon radical attached to each silicon atom, whereby the ratio of the number of said radicals to the number of silicon atoms is generally expressed as a fractional value higher than 1 and not, or not substantially, exceeding 2. Said hydrocarbon radicals may be alkyl (e.g. methyl), aryl (e.g. phenyl), and substituted aryl e.g. alkaryl (such as tolyl), or aralkyl (e.g. benzyl) radicals. The polymers may contain different radicals, and some of the hydrocarbon radicals may also be replaced by hydrogen; they may have terminal hydroxyl groups, or terminal substituted hydroxyl groups in which the hydrogen is wholly or in part replaced by alkyl radicals or carboxylic acid radicals. Representative examples are methyl polysiloxanes, methyl phenyl polysiloxanes, methyl hydrogen polysiloxanes and alkyl alkoxy silicones. They are soluble in conventional organic solvents and can be emulsified with addition of emulsifying agents in water.

Many, but not all of the above siloxane polymers form on heating solid insoluble resins which have found many uses as protective coatings and water repellents, e.g. for metals, textile and paper products, building materials and paints.

Useful results have been obtained with the so-called hydrogenosilicones, containing hydrogen atoms linked to silicon, as in methyl hydrogen polysiloxane. The latter may be employed in admixture with dimethylpolysiloxanes, such as mixtures described in British Patent specification No. 680,265. The organo-silicon materials are conveniently prepared by hydrolysis of hydrolysable organosilanes containing organic groups linked to the silicon through carbon-silicon linkage and containing hydrolyzable substituents directly attached to the silicon, said organic radicals being preferably alkyl, aryl, aralkyl or alkenyl radicals. Branched chain poly-siloxanes may be used, and may be produced by the hydrolysis of a mixture of hydrolyzable organosilanes of which at least one has three hydrolyzable substituents or by the hydrolysis of a mixture containing at least one hydrolyzable organosilane and also containing a silicon compound such as silicon tetrachloride which has four hydrolyzable substituents. In appropriate circumstances the starting materials from which the silicones can be prepared may be used instead of the silicones themselves.

In specification No. 20,828/54, now British patent specification No. 791,117, we have described and claimed how certain improvements in water-repellent finishes obtained by means of organo-silicon compounds may be brought about by treating the substrate with an organo-silicon compound and at least one isocyanate compound which is a polyisocyanate or a polyisothiocyanate or an adduct thereof. Among the improvements to be obtained are a greater resistance to the action of cleansing baths which contain detergents, notably washing baths and dry-cleaning baths. The following are examples of such polyisocyanates and polyisothiocyanates: Polymethylene diisocyanates, especially hexamethylene diisocyanate, and the corresponding diisothiocyanates; alkylene diisocyanates, e.g. propylene-1,2-diisocyanate, and the corresponding diisothiocyanates; alkylidene diisocyanates and the corresponding diisothiocyanates; cycloalkylene diisocyanates and the corresponding diisothiocyanates; aromatic and substituted aromatic polyisocyanates, e.g. phenyl-1,4-diisocyanate, m-toluylene diisocyanate, toluene-2,4,6-triisocyanate, chloro-phenylene 2,4-diisocyanate, and the corresponding diisothiocyanates; aliphatic-aromatic polyisocyanates, e.g. p,p'-diphenyl-methane diisocyanate and p,p',p''-triphenylmethane triisocyanate, and the corresponding polyisothiocyanates. It will be understood that mixtures of polyisocyanates and/or polyisothiocyanates and mixed isocyanate/isothiocyanate polyfunctional compounds may be used.

When using a silicone, an isocyanate and a metal compound which acts as a curing agent for the silicone, some difficulty has been experienced in preparing a working bath of all the three components, namely the organo-silicone compound, the polyisocyanate or polyisothiocyanate, and the metal curing agent, because most known metal curing agents are precipitated by the polyisocyanate. For example, a curing agent for silicones, namely butyl ortho-titanate, which is described and claimed in British patent specification No. 708,821, will form a precipitate in some 10 to 15 minutes at working bath concentrations of polyisocyanate in an organic solvent.

It has now been found, according to the present invention that metal salts of acids of the formula

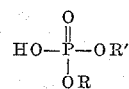

where R is aryl or substituted aryl, preferably t-alkyl-aryl, and R' is hydrogen or alkyl, are effective curing agents for silicones. Examples of substituted phosphoric acids, the metal salts whereof may be used according to the present invention, are described and claimed in British patent specification Nos. 699,080 and 709,628. As is more particularly described hereinafter, the tin salt has given very good results, and its preparation is described and claimed in British patent specification No. 731,386. This metal salt is described as having wetting properties, surface tension-reducing properties and soil-suspending properties in hydrocarbons. It is rather surprising, therefore, that such compounds, which are claimed to have these properties, should be useful in producing protective finishes particularly of a hydrophobic nature, since it had previously been known that such finishes would be adversely affected by the presence of bodies having surface-active properties. Thus, for example, when applying hydrophobic organo-silicone finishes to textiles, it has been regarded as essential to remove from the substrate all traces of detergents or other surface-active bodies that are usually used in the preparation or dyeing of the textile. Further, when any substrate bearing the protective finish is subsequently washed with a detergent, or dry-cleaned with an organic solvent containing a detergent it has been regarded as essential to remove all traces of detergent from the material. Indeed, it has been considered preferable to use detergent-free solvent, so as to effect the minimum of interference with the protective finish.

A particular advantage of the present invention is that it facilitates the use of silicone/isocyanate compositions, since it is possible to prepare a relatively stable composition comprising both the isocyanate and the metal salt, in addition to the silicone, in an organic solvent.

A further advantage obtainable by the use of metal salts according to the present invention is that the protective finish may, if desired, be applied to a substrate in conjunction with an aminoplast resin, e.g. of the urea/formaldehyde type or of the melamine-formaldehyde type.

A still further advantage is that, if it be desired to use a silicone in conjunction with both an isocyanate and a titanium or other metal curing agent such as butyl titanate, it is possible to do so by adding a metal salt as described above so as to obtain workable compositions.

Although the invention is applicable to substrates of various types, as has already been described, it will be appreciated that the invention is of primary importance when applied to textiles.

The invention is applicable to textiles that have already been finished in a conventional manner, that is to say the treatment may be applied for example to textiles which contain softening agents, lubricating agents, antiseptics or which have been anticreased or stabilized by means of thermosetting resinous condensates.

The invention may also be applied in some cases by treating before or simultaneously with conventional finishing agents as has already been mentioned in relation to aminoplast resins.

It will be understood that the invention comprises not only the above-mentioned new processes of applying protective finishes to substrates, and the substrates which have been so treated, but also the new compositions contemplated herein. Such compositions include not only the substrate-treating compositions, including a silicone, and its precursors, a metal salt as aforesaid, an organic solvent, and, if desired, an isocyanate and possibly a titanium compound, but also such new preparations as will lead to these substrate-treating compositions.

The preferred metals used in the form of their salts, according to the invention, are tin and copper but other metals may be used e.g. zinc, lead, cobalt, titanium and zirconium.

Of the substituted phosphoric acids that can be employed in the invention in the form of metal salts, it has been made clear that preferably the group R is a t-alkyl-aryl group; R' while it can be hydrogen is preferably alkyl, for instance a methyl, ethyl, propyl, octyl or decyl group, and particularly a lower alkyl group, that is one containing 1 to 4 carbon atoms. The group R is preferably a t-alkyl-phenyl group, for instance t-butyl-phenyl, t-hexyl-phenyl, t-octyl-phenyl, or t-dodecyl-phenyl. Excellent results are obtained when the alkyl group is in the para position, as in a p-t-alkyl-phenyl phosphoric acid. A t-alkyl-aryl group can contain other substituents in the aryl nucleus, for example a hydrocarbon group such as alkyl, for instance lower alkyl, e.g. methyl and ethyl.

The following examples are given for the purpose of illustrating the invention and the results of its performance. All parts and percentages are by weight.

The "silicone" employed throughout the examples, unless otherwise specified, is a mixture containing 60 percent by weight of trimethylsiloxy end-blocked methyl-hydrogenpolysiloxane and 40 percent by weight of a trimethylsiloxy end-blocked dimethylpolysiloxane having a viscosity of 12,800 centistokes at 25° C.

The methyl-p-t-octyl phenyl phosphoric acid material in the examples is believed to have the formula

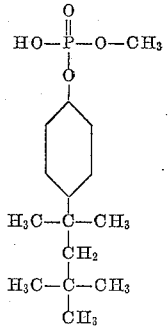

The so-called Bundesmann test used for determining the water-repellency of textiles in the following examples is Tentative Textile Standard No. 8, 1955, described in the British Standards Handbook No. 11, 1956 edition. The rate of flow of water according to the test is 65 ml. per minute and the test time 10 minutes. Means are provided in this test for any water passing through the fabric to be collected and measured. Thus two observations are recorded:

(a) The resistance to actual wetting as measured by the amount of absorption, e.g. weight increase determination, and (b) The penetration, i.e. the extent to which the fabric resists passage of water. The test results are the mean of at least two determinations. The spray test used for determining the water-repellency of textiles in the following examples is the Spray Rating Test of the American Society for Testing Materials (A.S.T.M.) Standard Spray Test D583–54.

*Example 1*

Solutions containing respectively (a) two parts of silicone and 0.375 part of the stannous salt of methyl-p-t-octyl-phenyl phosphoric acid in 97.625 parts of white spirit and (b) 2 parts of silicone in 98 parts of white spirit are prepared. Separate specimens of cotton gabardine fabric are passed through each solution and are squeezed between rollers to pick up comparable quantities of silicone. The fabrics are dried and heated for 3 minutes 30 seconds at 160° C.

On testing by the Bundesmann method an improved result is obtained by the added tin ester salt.

| Treatment | Bundesmann results | |
|---|---|---|
| | Absorption (percent) | Penetration (ml.) |
| (a) Silicone plus metal ester salt | 16 | 0 |
| (b) Silicone | 38 | 1 |

*Example 2*

A series of solutions is prepared by mixing (a) 2 parts of silicone with 98 parts of white spirit, (b) 2 parts of silicone with 0.075 part of the stannous salt of methyl-p-t-octyl-phenyl phosphoric acid (subsequently referred to as tin ester salt) and 97.925 parts of white spirit, (c) 2 parts silicone with 0.375 part of the aforesaid tin ester salt and 97.625 parts of white spirit, and (d) 2 parts of silicone with 1.5 parts of the aforesaid tin ester salt and 96.5 parts of white spirit.

Four specimens of a cotton/wool union fabric are passed, one through each solution, and then through a mangle to retain comparable quantities of silicone, and are dried and heated for 3 minutes 20 seconds at 150° C.

The test results show an increasing improvement with added amounts of tin ester salt.

| Treatment | Bundesmann results | |
|---|---|---|
| | Absorption (percent) | Penetration (ml.) |
| (a) Silicone 2% | 84 | 100 |
| (b) Silicone 2%, tin ester salt 0.075% | 60 | 51 |
| (c) Silicone 2%, tin ester salt 0.375% | 36 | 3 |
| (d) Sililone 2%, tin ester salt 1.5% | 25 | 3 |

*Example 3*

Solutions of silicones are prepared as follows:

(a) 2 parts of silicone mixture containing methyl hydrogen silicone used in Examples 1 and 2, and 0.375 part of the stannous salt of methyl p-t-octyl-phenyl phosphoric acid are dissolved in 97.625 parts of white spirit;

(b) 2 parts of the silicone mixture used in Examples 1 and 2 are dissolved in 98 parts of white spirit.

(c) 2 parts of trimethyl siloxy end-blocked dimethyl silicone oil (viscosity 350 cs.) and 0.376 part of the stannous salt of methyl p-t-octyl-phenyl phosphoric acid are dissolved in 97.625 parts of white spirit.

(d) 2 parts of the trimethyl siloxy end-blocked dimethyl silicone oil (viscosity 350 cs.) are dissolved in 98 parts of white spirit.

Specimens of a nylon taffeta fabric are passed one through each solution and mangled to retain 40 parts of solution for every 100 parts of fabric. The specimens are dried and heated for 4 minutes at 140° C.

All specimens are tested for water resistance by the American Society for Testing Materials (A.S.T.M.) Standard Spray Test D583-54 and give the following results.

Treatment: Spray rating
 (a) Silicone mixture containing methyl hydrogen silicone plus tin ester salt catalyst, 2% _ 100
 (b) Silicone mixture containing methyl hydrogen silicone, 2% _____ 70
 (c) Silicone oil plus tin ester salt catalyst, 2% _ 90
 (d) Silicone oil, 2% _____ 70

*Example 4*

A three component impregnation solution (A) is prepared by dissolving 1.66 parts of silicone, 0.33 part of the stannous salt of methyl para tertiary octyl phenyl phosphoric acid and 1 part of meta-toluylene diisocyanate in 97 parts of white spirit. This solution remains clear on standing in an open vessel for 4 hours. For purposes of comparison a solution (B) is prepared by dissolving 2.5 parts of silicone and 0.5 part of the aforesaid stannous salt in 97 parts of white spirit. In a third solution (C) 3 parts of silicone are dissolved in 97 parts of white spirit. Each solution contains therefore 3 parts of active agent.

Specimens of wool/cotton union gaberdine fabric are passed one through each of the prepared solutions A, B and C, and are mangled to retain their own weight of solution. After drying in warm air each sample is heated for 3 minutes 20 seconds at 150° C. and tested for water repellency by the Bundesmann method.

| Treatment | Bundesmann results | |
|---|---|---|
| | Absorption (percent) | Penetration (ml.) |
| Solution A. Silicone plus isocyanate plus tin catalyst | 18 | 40 |
| Solution B. Silicone plus tin catalyst | 34 | 73 |
| Solution C. Silicone | 79 | 240 |

*Example 5*

It is shown in our specification No. 20,828/54, now British patent specification No. 791,117, that pretreatment of textile fabrics with polyfunctional isocyanates improve the water-repellency obtained on subsequent treatment with silicone and catalyst. This example shows that using a tin ester-salt of phosphoric acid as catalyst, a single treatment with silicone, isocyanate and catalyst gives an equally high degree of water-repellency as that obtained using a comparable two-bath treatment.

Solutions are made up by mixing the following:

(a) 2 parts of silicone, 1.5 parts of the stannous salt of methyl p-t-octyl-phenyl phosphoric acid and 1 part of metatoluylene diisocyanate in 95.5 parts of white spirit.

(b) 1 part of metatoluylene diisocyanate in 99 parts of white spirit.

(c) 2 parts of silicone and 1.5 parts of the stannous salt of methyl p-t-octyl phenyl phosphoric acid in 96.5 parts of white spirit.

A specimen 1 of wool/cotton union fabric is passed through solution (a) and is squeezed between rollers to pick up its own weight of solution. After drying in a current of warm air it is heated for 3 minutes 20 seconds at 150° C. A second specimen 2 of the same fabric is impregnated with solution (b) in a similar manner, and after drying, is heated for 3 minutes 20 seconds at 150° C. It is then impregnated with solution (c), dried, and again heated for 3 minutes 20 seconds at 150° C. The two specimens have water-repellencies which are identical within the limits of error of the Bundesmann test.

| Treatment | Bundesmann results | |
|---|---|---|
| | Absorption (percent) | Penetration (ml.) |
| 1. Silicone, tin catalyst and isocyanate applied from one bath | 19 | 5 |
| 2. Treated with isocyanate and then with silicone and tin catalyst | 19 | 3 |

*Example 6*

Solutions are made up by mixing the following:

(a) 1.66 parts of silicone, 0.33 part of the stannous salt of methyl p-t-octyl-phenyl phosphoric acid and 1 part of metatoluylene diisocyanate in 97 parts of white spirit.

(b) 2.5 parts of silicone and 0.5 part of the stannous salt of methyl p-t-octyl-phenyl phosphoric acid in 97 parts of white spirit.

Separate specimens of a cotton gaberdine fabric are passed one through each solution and squeezed between rollers. After removing the solvent in a current of air, the specimens are heated 3 minutes 20 seconds at 160° C. Each specimen is then cut into two portions. Two portions, one of each specimen, are washed together for 45 minutes in a solution of 5 parts of soap in 1000 parts of water at 50° C., using a liquor to fabric ratio of 50:1, and are rinsed. After drying, all portions of the specimens are tested for water-repellency on the Bundesmann apparatus. Although the two specimens are equally water-repellent initially, the one treated with all three substances has the most durable finish and allows no penetration of water on testing, even after washing.

| Treatment | Initially | | Bundesmann results after washing | |
|---|---|---|---|---|
| | Abs., (percent) | Pen., (ml.) | Abs., (percent) | Pen., (ml.) |
| (a) Treated with silicone, tin catalyst and isocyanate | 19 | 0 | 35 | 0 |
| (b) Treated with silicone and tin catalyst | 19 | 0 | 43 | 40 |

Example 7

Specimens of a gaberdine fabric having a warp of wool and a weft of cotton are treated as follows:

One specimen is impregnated with a solution of 1 part of m-toluylene diisocyanate in 99 parts of white spirit and, after evaporating the solvent in a current of air, is heated for 3 minutes 20 seconds at 150° C. It is then impregnated with a solution of 2 parts of a silicone mixture, the said silicone mixture consisting of 60% by weight of a trimethyl siloxy end-blocked methyl hydrogen polysiloxane having a ratio of methyl radicals plus hydrogen atoms to silicon atoms of between 2.0 and 2.1 and a viscosity of 25 centistockes at 25° C., and 40% by weight of a dimethyl polysiloxane having a ratio of methyl radicals to silicon atoms of 2.0, the end silicon atoms of each molecule being linked to two methyl radicals and one hydroxyl radical, and having a viscosity of 14,000 centistokes at 25° C., and 0.5 part of the stannous salt of methyl p-t-octyl phenyl phosphoric acid in 98.5 parts of white spirit. After evaporating the solvent, the specimen is again heated for 3 minutes 20 seconds at 150° C.

A second specimen is impregnated with a solution of 2 parts of the silicone mixture, 0.5 part of the tin ester salt and 1 part of m-toluylene diisocyanate in 96.5 parts of white spirit. The solvent is then evaporated and the specimen is heated for 3 minutes 20 seconds at 150° C.

Results of Bundesmann tests carried out on the treated specimens show that the water-repellency of the second specimen is almost identical with that of the first specimen, although the second process is much simpler than the first.

| Treatment | Bundesmann test | |
|---|---|---|
| | Absorption (Precent) | Penetration (ml.) |
| (a) m-Toluylene diisocynate, 1% followed by silicone, 2% and tin ester salt, 0.5% | 18 | 5 |
| (b) Silicone, 2% tin ester salt, 0.5% and m-toluylene diisocyanate, 1%, applied from one bath | 19 | 5 |

Example 8

Three solutions are made up as follows:

Solution (a) contains 3 parts of silicone and 97 parts of white spirit.

Solution (b) contains 3 parts of the stannous salt of methyl p-t-octyl phenyl phosphoric acid and 97 parts of white spirit.

Solution (c) contains 2.4 parts of silicone, 0.6 part of the stannous salt of methyl p-t-octyl phenyl phosphoric acid and 97 parts of white spirit.

Three specimens of rubber sheeting are treated, one with each solution, by dipping and allowing the solvent to evaporate. Three specimens of sheet aluminum are similarly treated with the solutions. After allowing the specimens to stand at room temperature for 48 hours to permit any reaction between the silicone and the tin compound to take place, the angles of contact between the specimens and distilled water are measured by the method of Adam and Jessop (described in "Properties of Matter" by Champion & Davy, Blackie & Son Ltd., Glasgow). These measurements clearly demonstrate the improved water-repellency of the surfaces treated with the silicone and the tin salt.

| Treatment | Angle of contact, deg. | |
|---|---|---|
| | Rubber | Aluminum |
| (a) Silicone, 3% | 69 | 87 |
| (b) Stannous methyl p-tert octyl phenyl phosphate, 2.4%. | 51 | 85 |
| (c) Silicone, 3% and stannous methyl p-tert octyl phenyl phosphate, 0.6%. | 119 | 107 |

Example 9

A series of solutions having the following constituents is prepared:

(a) 3 parts of silicone and 97 parts of white spirit.

(b) 3 parts of the stannous salt of methyl p-octyl phenyl phosphoric acid and 97 parts of white spirit.

(c) 2.4 parts of silicone, 0.6 part of the aforesaid tin ester salt and 97 parts of white spirit.

(d) 3 parts of chlorophenylene 2,4-diisocyanate and 97 parts of white spirit.

(e) 3 parts of p,p',p''-triphenyl methane triisocyanate and 97 parts of methylene chloride.

(f) 3 parts of a triisocyanate, prepared by condensing 3 gram-molecules of m-toluylene diisocyanate with 1 gram-molecule of hexane triol, and 97 parts of ethyl acetate.

(g) 1.6 parts of silicone, 0.4 part of the tin ester salt, 1 part of chlorophenylene 2.4-diisocyanate and 97 parts of white spirit.

(h) 1.6 parts of silicone, 0.4 part of the tin ester salt, 1 part of p,p',p''-triphenylmethane triisocyanate and 97 parts of methylene chloride.

(i) 1.6 parts of silicone, 0.4 part of the tin ester salt, 1 part of the triisocyanate described in (f) above, and 97 parts of ethyl acetate.

Nine specimens of a cotton gaberdine fabric are impregnated each with one of the above solutions, and the solvents are evaporated in a current of air. Nine specimens of a wool-cotton fabric and nine specimens of a wool-Terylene fabric are similarly treated. All the specimens are then heated, the treatment being for 3 minutes 30 seconds at 160° C. in the case of cotton fabric and for 3 minutes 20 seconds at 150° C. in all other cases.

The water repellencies of the treated specimens are then assessed by the Bundesmann test. The results show that the treatments involving all three components (silicone, metallic compound, and isocyanate) give better water-repellency than other treatments.

The solutions were stable for at least 3 hours in an open vessel (after which time they were discarded) with the exception of solutions (d) and (g) containing chlorophenylene 2.4-diisocyanate. A precipitate formed in solution (d) at the same time as one formed in solution (g), presumably as a result of reaction between the isocyanate and moisture in the air.

| Treatment | Bundesmann test | | | | | |
|---|---|---|---|---|---|---|
| | Cotton gaberdine | | Wool-cotton gaberdine | | Wool Terylene | |
| | Absorption (Percent) | Penetration (ml.) | Abs. (Percent) | Pen. (ml.) | Abs. (Percent) | Pen. (ml.) |
| (a) Silicone 3% | 60 | 39 | 55 | 52 | 91 | 390 |
| (b) Tin ester salt 3% | 57 | 44 | 58 | 25 | 72 | 130 |
| (c) Silicone 2.4% and tin ester salt, 0.6% | 25 | 0 | 31 | 1 | 64 | 90 |
| (d) Chlorophenylene diisocyanate, 3% | 40 | 16 | 42 | 1 | 57 | 56 |
| (e) Triphenyl methane triisocyanate, 3% | 42 | 28 | 48 | 1 | 59 | 95 |
| (f) Isocyanate compound, 3% | 34 | 0 | 45 | 7 | 57 | 65 |
| (g) Silicone 1.6%, tin ester salt, 0.4% and chlorophenylene diisocyanate, 1% | 15 | 0 | 12 | 2 | 42 | 2 |
| (h) Silicone, 1.6%, tin ester salt, 0.4% and triphenyl methane triisocyanate, 1% | 12 | 0 | 10 | 2 | 37 | 1 |
| (i) Silicone, 1.6%, tin ester salt, 0.4%, and isocyanate compound, 1% | 16 | 0 | 13 | 2 | 45 | 1 |

Example 10

A varnish composed of 15 parts of a phenyl methyl silicone resin having a ratio of phenyl radicals plus methyl radicals to silicon atoms of 1:7 and a ratio of methyl to phenyl groups of 1:85, 15 parts of the stannous salt of methyl p-t-octyl phenyl phosphoric acid and 70 parts of ethyl acetate, is spread on a glass plate and allowed to dry to form a film. On examining a week later the film is not tacky, i.e. a ball of cotton wool does not stick to it.

A varnish made from 30 parts of the phenyl methyl silicone resin and 70 parts of ethyl acetate is very tacky after one week on a glass plate.

The above-mentioned films are stoved for 10 minutes at 180° C. to achieve a further hardening effect. A firmly-adhering tack-free film is obtained from the resin containing the tin-salt, whereas the other film, prepared from the silicone alone, remains tacky even after this stoving treatment.

Although the examples have so far been restricted to the use of tin-salts only, it is possible also to use salts of other metals, especially copper and lead, as will be described in the following examples.

*Example 11*

A specimen of a cotton gabardine fabric is impregnated with a solution containing 2 parts of silicone, 0.5 part of the cupric salt of methyl p-t-octyl phenyl phosphoric acid and 97.5 parts of white spirit, and the solvent is evaporated in a current of air. The specimen is then heated for 3 minutes 30 seconds at 160° C. For comparison, a similar specimen is likewise treated with a solution of 2 parts of silicone and 98 parts of white spirit. The results of Bundesmann tests carried out on the two specimens are as follows:

| Treatment | Bundesmann test | |
| --- | --- | --- |
| | Absorption (Percent) | Penetration (ml.) |
| (a) Silicone, 2%, and copper ester salt, 0.5% | 15 | 1 |
| (b) Silicone, 2% | 45 | 25 |

*Example 12*

A specimen of an acetate poult fabric is impregnated with a solution containing 2 parts of silicone, 0.5 part of the lead salt of methyl p-t-octyl phenyl phosphoric acid and 97.5 parts of white spirit, and the solvent is evaporated in a current of air. The specimen of the fabric is similarly treated with a solution of 2 parts of silicone in 98 parts of white spirit. The results of Bundesmann tests carried out on the two specimens are as follows:

| Treatment | Bundesmann test | |
| --- | --- | --- |
| | Absorption (Percent) | Penetration (ml.) |
| (a) Silicone, 2%, and lead ester salt, 0.5% | 38 | 8 |
| (b) Silicone, 2% | 58 | 23 |

*Example 13*

A series of solutions containing the four components silicone, metal ester salt, butyl titanate and m-toluylene-diisocyanate are prepared by adding these materials to a common solvent, white spirit, in the order and the quantities given in the table below. The time taken for the appearance of a precipitate is recorded in the table. These results show that with increasing quantities of the metal ester salt a marked improvement in the working life of the mixture is obtained.

Specimens of cotton gabardine are impregnated in a similar series of solutions within the working life, dried and heated for 3 minutes 30 seconds at 160° C., and then tested for water-repellency.

| Solution in white spirit | Precipitation time (minutes) | Bundesmann test | |
| --- | --- | --- | --- |
| | | Absorption (Percent) | Penetration (ml.) |
| 1. Silicone, 2%, butyl titanate, 0.125% m-toluylene diisocyanate 1% (no tin ester salt) | <15 | 29.4 | 0 |
| 2. As 1, but including tin ester salt in amount 0.1% | 15 | 29.2 | 0 |
| 3. As 1, but including tin ester salt in amount 0.5% | 30 | 26.9 | 0 |
| 4. As 1, but including tin ester salt in amount 2.5% | 60 | 26.1 | 0 |

This application is a division of co-pending application Serial No. 708,378, filed January 13, 1958, and now abandoned.

Having fully described the invention, what is claimed is:

1. A process for the production of a protective finish on a solid substrate comprising applying thereto a mixture of an organopolysiloxane and a curing agent in solution in a petroleum fraction solvent, said curing agent being a metal salt of an acid of formula:

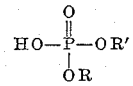

where R is selected from the group consisting of aryl or substituted aryl radicals, R' is selected from the group consisting of hydrogen and alkyl and the metal is selected from the group consisting of tin, copper and lead radicals, and curing said organopolysiloxane on said substrate.

2. A process according to claim 1, wherein said mixture contains an isocyanate compound selected from the group consisting of polyisocyanates and polyisothiocyanates, said compounds having organic radicals directly linked to isocyanate groups by C—N linkages.

3. A process according to claim 1, wherein R is t-alkyl-aryl.

4. A process according to claim 1, wherein the said metal salt is of a t-octyl-phenyl phosphoric acid.

5. A process according to claim 1, wherein the said metal salt is a tin salt.

6. A process according to claim 1, wherein the said metal salt is a copper salt.

7. A process according to claim 1, wherein the substrate material is a textile material.

8. A composition comprising a petroleum fraction solvent in which there is dissolved an organopolysiloxane and a metal salt selected from the group consisting of copper, tin and lead, of an acid formula:

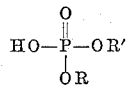

where R is selected from the group consisting of aryl and substituted aryl radicals, and R' is selected from the group consisting of hydrogen and alkyl radicals.

9. A composition according to claim 8, comprising also an isocyanate dissolved therein, said isocyanate selected from the group consisting of polyisocyanates and polyisothiocyanates, said compounds having organic radicals directly linked to isocyanate groups by C—N linkages.

10. A composition according to claim 8, wherein the said metal salt is of a p-octylphenyl phosphoric acid.

11. A composition according to claim 8, wherein the metal salt is a tin salt.

12. A composition according to claim 8, wherein the metal salt is a copper salt.

13. A process for rendering material water repellent comprising applying to said material a mixture of (a) an organosilicon compound selected from the group consisting of the product obtainable by hydrolysis of hydrolyzable organosilanes containing organic groups linked to the silicon through carbon-silicon linkage and containing hydrolyzable substituents directly attached to silicon and (b) a curing agent therefor, said curing agent being a metal salt selected from the group consisting of tin, copper and lead of an acid of formula:

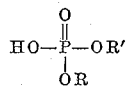

wherein R is selected from the group consisting of aryl and substituted aryl radicals and R' is selected from the group consisting of hydrogen and alkyl radicals, and curing said organosilicon compound on said material.

14. The process as defined in claim 13 wherein said curing agent is the stannous salt of methyl p-t-octyl-phenyl phosphoric acid.

15. The process as defined in claim 13 wherein said curing agent is the copper salt of methyl-p-t-octyl-phenyl phosphoric acid.

16. The process as defined in claim 14 wherein said organosilicon compound is a mixture of 60 percent by weight of trimethylsiloxy end-blocked methylhydrogen polysiloxane and 40 percent by weight of a trimethylsiloxy end-blocked dimethylpolysiloxane having a viscosity of 12,800 centistokes at 25° C.

17. A process for rendering textile material water-repellent comprising applying to said material a mixture of (a) an organosilicon compound selected from the group consisting of the product obtainable by hydrolysis of hydrolyzable organosilanes containing organic groups linked to the silicon through carbon-silicon linkage and containing hydrolyzable substituents directly attached to silicon and (b) a curing agent therefor and (c) an isocyanate compound selected from the group consisting of polyisocyanates, polyisothiocyanates and adducts thereof, said isocyanate compounds having organic radicals directly linked to isocyanate groups by C—N linkages, said curing agent being a metal salt selected from the group of metals consisting of tin, copper and lead, of an acid of formula

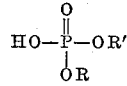

where R is selected from the group consisting of aryl and substituted aryl radicals and R' is selected from the group consisting of hydrogen and alkyl radicals, and curing said organosilicon compound on said material.

18. The process as defined in claim 17 wherein said curing agent is the stannous salt of methyl-p-t-octyl-phenyl phosphoric acid.

19. The process as defined in claim 17 wherein said curing agent is the copper salt of methyl-p-t-octyl-phenyl phosphoric acid.

20. The process as defined in claim 18 wherein said organosilicon compound is a mixture of 60 percent by weight of trimethylsiloxy end-blocked methylhydrogen polysiloxane and 40 percent by weight of a trimethylsiloxy end-blocked dimethylpolysiloxane having a viscosity of 12,800 centistokes at 25° C.

21. The process as defined in claim 18 wherein said organosilicon compound is trimethyl siloxy end-blocked dimethyl silicone oil.

22. The process as defined in claim 18 wherein said organosilicon compound is a mixture of 60 percent by weight of a trimethylsiloxy end-blocked methyl hydrogen polysiloxane having a ratio of methyl radicals plus hydrogen atoms to silicon atoms of between 2.0 and 2.1 and a viscosity of 25 centistokes at 25° C. and 40 percent by weight of a dimethyl polysiloxane having a ratio of methyl radicals to silicon atoms of 2.0, the end silicon atoms of each molecule being linked to two methyl radicals and one hydroxyl radical, and having a viscosity of 14,000 centistokes at 25° C.

23. A composition consisting essentially of a phenyl methyl silicone resin having a ratio of phenyl radicals plus methyl radicals to silicon atoms of 1:7 and a ratio of methyl to phenyl groups of 1:85 and as a curing agent therefor, the stannous salt of methyl p-t-octyl phenyl phosphoric acid.

24. The process of producing a protective finish on a solid substrate comprising applying thereto the composition defined in claim 22 and curing said composition on said substrate.

25. A solid substrate having a protective finish thereon made in accordance with the process defined in claim 1.

26. A composition for use in applying a protective finish on a solid substrate, said composition consisting essentially of (a) an organosilicon compound selected from the group consisting of the product obtainable by hydrolysis of hydrolyzable organosilanes containing organic groups linked to the silicon through carbon-silicon linkage and containing hydrolyzable substituents directly attached to silicon and (b) a curing agent therefor, said curing agent being a metal salt selected from the group consisting of tin, copper and lead of an acid of formula

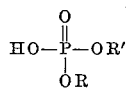

where R is selected from the group consisting of aryl and substituted aryl radicals and R' is selected from the group consisting of hydrogen and alkyl radicals.

27. A composition for use in applying a protective finish on a solid substrate, said composition consisting essentially of (a) an organosilicon compound selected from the group consisting of the product obtainable by hydrolysis of hydrolyzable organosilanes containing organic groups linked to the silicon through carbon-silicon linkage and containing hydrolyzable substituents directly attached to silicon and (b) a curing agent therefor and (c) an isocyanate compound selected from the group consisting of polyisocyanates, polyisothiocyanates and adducts thereof, said isocyanate compounds having organic radicals directly linked to isocyanate groups by C—N linkages, said curing agent being a metal salt selected from the group of metals consisting of tin, copper and lead, of an acid of formula

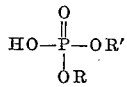

where R is selected from the group consisting of aryl and substituted aryl radicals and R' is selected from the group consisting of hydrogen and alkyl radicals.

References Cited in the file of this patent

UNITED STATES PATENTS

| | | |
|---|---|---|
| 2,449,572 | Welsh | Sept. 21, 1948 |
| 2,588,366 | Dennett | Mar. 11, 1952 |
| 2,739,952 | Linville | Mar. 27, 1956 |
| 2,750,305 | Gagarine et al. | June 12, 1956 |
| 2,774,690 | Cockett et al. | Dec. 18, 1956 |
| 2,787,274 | Gant et al. | Apr. 2, 1957 |
| 2,789,956 | Eder | Apr. 23, 1957 |
| 2,803,614 | Solomon | Aug. 20, 1957 |

FOREIGN PATENTS

| | | |
|---|---|---|
| 118,839 | Australia | Aug. 17, 1944 |
| 787,175 | Great Britain | Dec. 4, 1957 |
| 791,117 | Great Britain | Feb. 26, 1958 |